United States Patent
Kuechler et al.

(10) Patent No.: US 7,032,726 B2
(45) Date of Patent: Apr. 25, 2006

(54) CONTROL ELEMENT

(75) Inventors: Wolfgang Kuechler, Ostheim (DE); Stefan Schuberth, Bad Neustadt (DE)

(73) Assignee: Preh-Werke GmbH & Co. KG, Bad Neustadt a.d. Saale (DE)

( * ) Notice: Subject to any disclaimer, the term of this patent is extended or adjusted under 35 U.S.C. 154(b) by 0 days.

(21) Appl. No.: 10/727,623

(22) Filed: Dec. 5, 2003

(65) Prior Publication Data
US 2004/0107784 A1    Jun. 10, 2004

(30) Foreign Application Priority Data
Dec. 7, 2002   (DE) ............... 102 57 258

(51) Int. Cl.
*F16F 9/32*   (2006.01)
(52) U.S. Cl. .................... 188/267; 188/267.1
(58) Field of Classification Search ........ 335/205–207; 292/34, 40; 188/267–267.2
See application file for complete search history.

(56) References Cited

U.S. PATENT DOCUMENTS

| | | | | |
|---|---|---|---|---|
| 2,260,255 A | * | 10/1941 | Leary | ......................... 118/259 |
| 3,117,093 A | * | 1/1964 | Arthur, Jr. et al. | ..... 252/62.51 C |
| 4,227,723 A | * | 10/1980 | Rosell | .......................... 292/34 |
| 6,854,573 B1 | * | 2/2005 | Jolly et al. | ................... 188/267 |

FOREIGN PATENT DOCUMENTS

| | | |
|---|---|---|
| DE | 195 28 457 A1 | 2/1997 |
| DE | 199 64 133 A1 | 6/2001 |
| DE | 100 29 191 A1 | 12/2001 |
| WO | WO 02/35457 A2 | 5/2002 |

* cited by examiner

*Primary Examiner*—Lincoln Donovan
(74) *Attorney, Agent, or Firm*—Birch, Stewart, Kolasch & Birch, LLP

(57) ABSTRACT

A system is provided that operates on the magnetorheological principle as a detent or wiper element and/or for electrical detection of direction of rotation. The system includes a gear pump, a rotary knob, and at least one gear. The gears is mechanically driven by the rotation of the rotary knob. A magnetorheological fluid is moved and/or pumped within a channel or ring. The viscosity of the fluid is changed by a pulsed magnetic field at a first coil that is provided on the channel, and thereby a change in the torque or the detent is produced. A second coil that is provided on the channel senses a direction of rotation of the rotary knob.

16 Claims, 2 Drawing Sheets

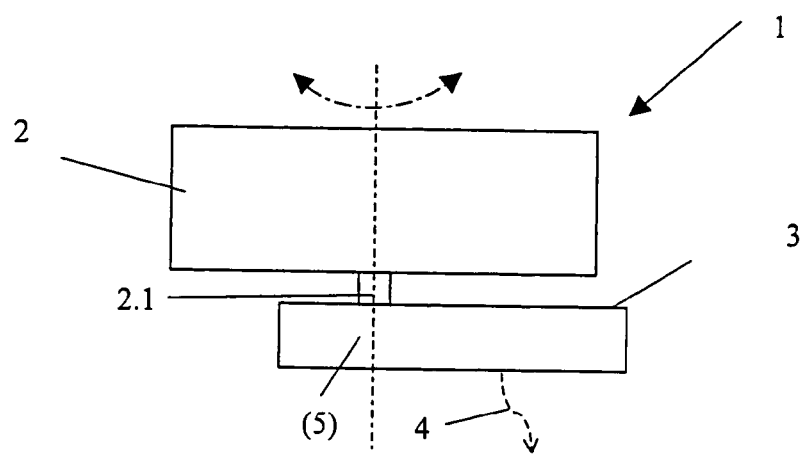
Fig. 1
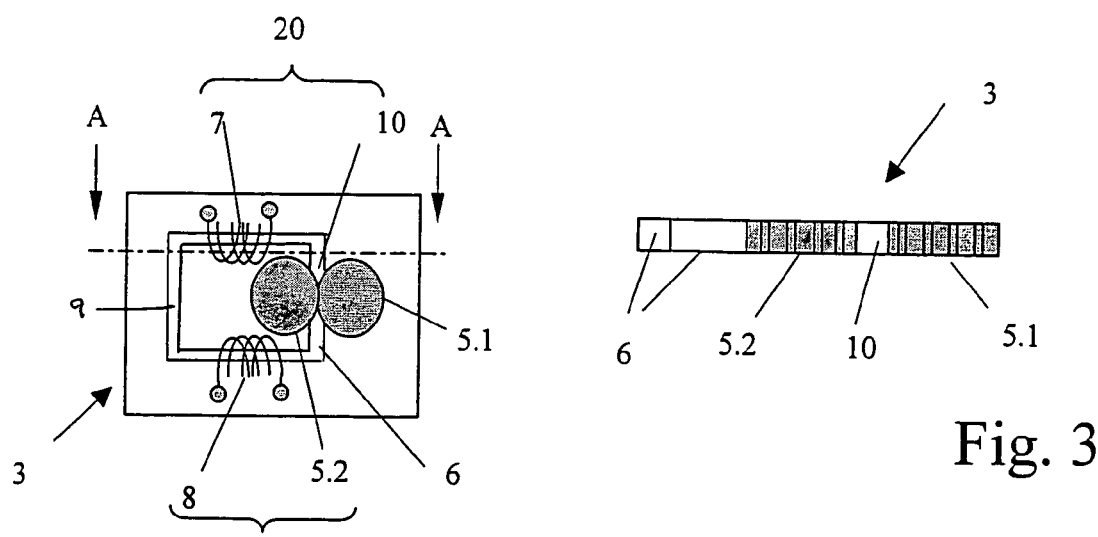
Fig. 2
Fig. 3

CONTROL ELEMENT

This nonprovisional application claims priority under 35 U.S.C. § 119(a) on German Patent Application No. 102 57 258.5-34 filed in Germany on Dec. 7, 2002, which is herein incorporated by reference.

BACKGROUND OF THE INVENTION

1. Field of the Invention

The present invention relates to a control element having a rotary knob, a rotating axle, and a detent device that includes a gear pump, which is integrated into the cross-section of a channel, by which a magnetorheological fluid is pumped by the gear pump through the channel when the rotary knob is rotated.

2. Description of the Background Art

DE 199 64 133 A1 discloses a rotary switch or rotary control that meets so-called knob impact criteria and has a wiper plate on the lower part of its rotary knob. The corresponding signals are sensed by contact springs on a base plate. This makes it possible for the operational control to be continuously rotated. The detent is produced by a lateral knurled wheel.

Another known detent element is sliding detent springs such as are frequently encountered in potentiometers. Also known are rotary controls based on the principle of magnetic field change, such as are described in EP 0 780 852 B1, for example.

Known from DE 100 29 191 A1 is an electronically controlled rotary fluid knob as a haptic control element. In one of the example embodiments, the rotary control has a laminated stator part that is made of soft magnetic material, carries an armature winding and generates a radial magnetic field in a magnetically active gap between the stator part and another stator part. Located in this gap is an annular, nonmagnetic rotor, which is connected by a shaft to a bell-shaped rotary knob. Also located in the gap is a magnetically active fluid. The rotary knob can be braked with differing intensity and duration depending on whether a stop is to be simulated or a detent is to be felt. When the user turns the rotary knob, a perception of alternating positive and negative acceleration is produced for the user, which corresponds to the haptic feel of a detent. PWM control of the coil is preferred. In addition, an algorithm for haptic representation of a programmable stop is described. The rotational position of the rotor is converted into a signal representing the angle of rotation by a sensor for measuring the angle of rotation.

SUMMARY OF THE INVENTION

It is therefore an object of the present invention to provide a control element of simple design with an electric detent.

The invention is based on the idea of providing a system based on the magnetorheological principle as a detent or wiper element and/or for electrical detection of direction of rotation, and to design this as a type of add-on part that can easily be installed on an operational control. In this way, a sensor for measuring the angle of rotation can be eliminated, since the direction of rotation can be determined by a magnetorheological fluid in the add-on part.

The system in question has a small gear pump, preferably an external gear pump, that is functionally integrated into a ring or channel containing the fluid. The magnetorheological fluid is moved within the channel or ring, pumped by the gear pump. One of the gears is mechanically driven by the rotation of a rotary knob of the operational control or the like. Depending on the design, a coil is mounted on or surrounding the channel.

In the application case of the detent, software is used to supply the coil with a pulsed current, causing a pulsed magnetic field to arise in the coil. The viscosity of the fluid is changed by the change in the magnetic field acting on the fluid. Use is made here of the effect that a small magnetic field corresponds to a low viscosity of the fluid and a high viscosity fluid possesses a high magnetic field. This change in the viscosity causes a change in the torque or the detent. In the case of a low viscosity, this manifests itself as a light detent feel/torque, and high viscosity as a heavy detent feel/torque.

In the application case of detecting the direction of rotation, the direction of the fluid's flow is detected through the coil on the channel, and a directional signal is determined therefrom. If the driving gear turns to the right, the suction chamber is on the left and the pressure chamber on the right. If the gears turn in the opposite direction and the driving gear turns to the left, the suction chamber is on the right and the pressure chamber on the left. The direction of flow of the fluid changes, and hence the polarity of the induced current in the coil.

A combination of the two systems makes simplification possible, since only one channel with the fluid, a gear pump and two coils are required.

Moreover, the advantage of such a method of operation is that any desired detent curve can be created by software. This detent curve, created by software, determines the pulsation of the changing magnetic field at the first coil. In addition, at the end of a rotational motion, the torque can be selected to be high, for example, in order to indicate that an end position has been reached, such as maximum volume, maximum fan setting, etc.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 1 is a control element with an attached part;

FIG. 2 is a top view of the attached part from FIG. 1 in cross-section;

FIG. 3 is a section A—A through the attached part from FIG. 2; and

DETAILED DESCRIPTION OF THE PREFERRED EMBODIMENTS

Figure 4:
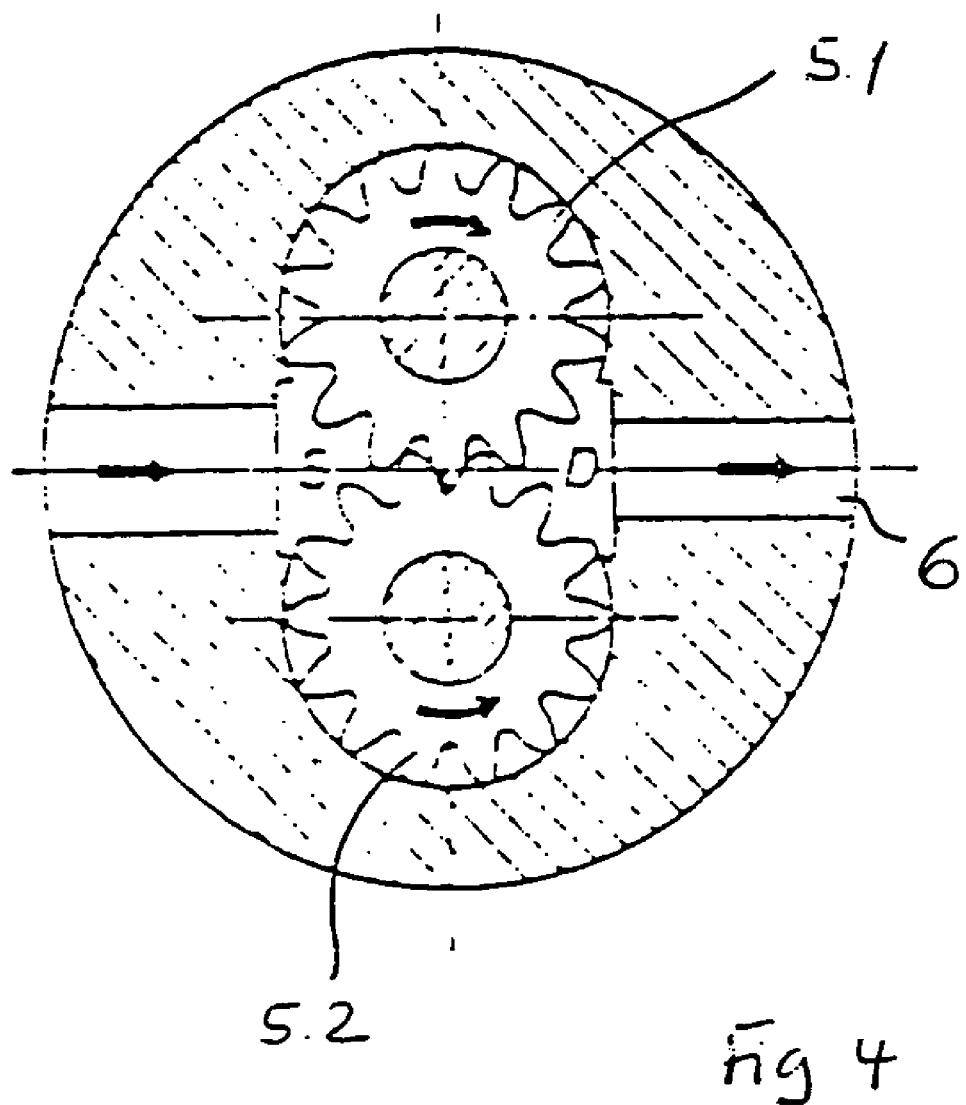
FIG. 4 is an enlarged view of the meshing of the gears.

The following example embodiment relates to the combination of a detent system 20 and a rotation sensing system 21, which detects a direction of rotation, in an attached part 3.

Shown in FIG. 1 is the structure of a control element 1, which includes at least a rotary knob 2 and an attached part 3. Electrical sensing of the attached part 3 is accomplished by line 4, which is provided for an electronic analysis unit (not shown), while mechanical coupling between the attached part 3 and the rotary knob 2 is performed by a rotating axle 2.1.

FIG. 2 shows an inner structure of the attached part 3. A gear pump 5, which has two gears 5.1 and 5.2, is located in the cross-section of a channel 6. One of the two gears 5.1, 5.2 is connected to the rotating axle 2.1. The gears 5.1, 5.2 have a diameter of approximately 4 mm, for example. A first coil 7 and a second coil 8 are mounted on the channel 6. Provided in the channel 6 is a magnetorheological fluid 9.

FIG. 3 shows this attached part 3 in the section A—A, wherein it can be seen that a region 10, in which the gears 5.1, 5.2 mesh, is located in the channel 6. FIG. 4 shows the meshing of the gears 5.1, 5.2 in an enlarged view.

The control element 1 functions as follows:

Turning the rotary knob 2 to the right rotates the gear 5.1 (here), which moves the gear 5.2 along with it. The fluid 9 is pumped through the channel 6 in a known manner. By the coil 7, which is supplied with a pulsed current and at which a magnetic field is produced, the viscosity of the fluid 9 can be changed on the basis of a predetermined detent curve in accordance with the desired haptics.

As the fluid 9 is transported along the second coil 8, the magnetic behavior of the fluid 9 generates a current therein, from which the direction of rotation of the rotary knob 2 and thus the rotational motion can be derived from the flow or transport direction of the fluid 9, since the polarity of the current changes as a function of the direction of transport.

The electrical sensing of the value to be set with the operational control 1 is not shown. It is self-evident that the operational element 1 can have a contact ring disk beneath the rotary knob 2 in the conventional manner, wherein the signal is picked up by contacts on a printed circuit board in the usual way. In this embodiment, the attached part 3 is then integrated between the rotary knob 2 and the printed circuit board.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A control element comprising:
   a rotary knob;
   a rotating axle; and
   a detent device that includes a gear pump, which is integrated into a cross-section of a channel, by which a magnetorheological fluid is pumped by the gear pump through the channel when the rotary knob is rotated, the rotary knob being connected to the detent device by the rotating axle,
   wherein a first coil is mounted on the channel, the first coil being utilized to change the viscosity of the magnetorheological fluid when different detent curves are to be defined and established, and
   wherein a flow direction of the magnetorheological fluid and thereby a direction of rotation of the rotary knob can be determined on the basis of the fluid flowing past the coil.

2. A control element comprising:
   a rotary knob;
   a rotating axle; and
   a sensing device for detecting a direction of rotation, the sensing device includes a gear pump that is integrated into a cross-section of a channel, by which a magnetorheological fluid is pumped by the gear pump through the channel when the rotary knob is rotated, the rotary knob being connected to the detent device by the rotating axle,
   wherein a coil is mounted on the channel, the coil determining a flow direction of the magnetorheological fluid and thereby a direction of rotation of the rotary knob can be determined on the basis of the fluid flowing past the coil.

3. A control element comprising:
   a rotary knob;
   a rotating axle; and
   a sensing device that includes a gear pump being integrated into a cross-section of a channel, the channel containing a magnetorheological fluid that is pumped through the channel by the gear pump on the basis of a rotation of the rotary knob, which is connected to the sensing device by the rotating axle, the sensing device further including a first coil and a second coil, each being provided on the channel, the first coil being used to alter a viscosity of the magnetorheological fluid, the second coil being used to determine a flow direction of the magnetorheological fluid and thereby a direction of rotation of the rotary knob can be determined on the basis of the magnetorheological fluid flowing past the coil.

4. The control element according to claim 1, wherein the gear pump is external to the detent device.

5. The control element according to claim 1, wherein the gears each have a diameter of approximately 4 mm.

6. The control element according to claim 1, wherein a pulsed current is supplied to the first coil by which a magnetic field is produced that acts on the fluid.

7. The control element according to claim 1, wherein any desired detent curve can be created by software which determines the pulsing of the changing magnetic field at the first coil.

8. The control element according to claim 1, wherein at the end of a rotational motion, the torque can be selected to be high in order to indicate an end position of the rotary knob.

9. The control element according to claim 2, wherein the gear pump is external to the detent device.

10. The control element according to claim 2, wherein the gears each have a diameter of approximately 4 mm.

11. The control element according to claim 2, wherein a pulsed current is supplied to the coil by which a magnetic field is produced that acts on the fluid.

12. The control element according to claim 3, wherein the gear pump is external to the detent device.

13. The control element according to claim 3, wherein the gears each have a diameter of approximately 4 mm.

14. The control element according to claim 3, wherein a pulsed current is supplied to the first coil and the second coil by which a magnetic field is produced that acts on the fluid.

15. The control element according to claim 3, wherein any desired detent curve can be created by software which determines the pulsing of the changing magnetic field at the first coil.

16. The control element according to claim 3, wherein at the end of a rotational motion, the torque can be selected to be high in order to indicate an end position of the rotary knob.

* * * * *